United States Patent [19]

McDermott et al.

[11] 3,752,406

[45] Aug. 14, 1973

[54] CONTAINERS FOR CHEMICAL LIGHT SOLUTIONS

[75] Inventors: Philip Auguste McDermott, Upper Saddle River; Andrew Milo Semsel, Sommerville, both of N.J.

[73] Assignee: American Cyanamid Company, Stamford, Conn.

[22] Filed: Sept. 17, 1971

[21] Appl. No.: 181,630

[52] U.S. Cl. ............................. 240/2.25, 222/541
[51] Int. Cl. ........................................... F21v 9/16
[58] Field of Search .................. 240/2.25; 222/94, 222/541

[56] References Cited
UNITED STATES PATENTS

| 3,584,211 | 6/1971 | Rauhut | 240/2.25 |
| 3,578,962 | 5/1971 | Gerber | 240/2.25 |
| 3,576,987 | 5/1971 | Voight et al. | 240/2.25 |
| 3,539,794 | 11/1970 | Rauhut et al. | 240/2.25 |

OTHER PUBLICATIONS

Technical Glasses, by M. B. Volf, 1961 Table 43 and Table XVII.

Primary Examiner—Richard L. Moses
Attorney—Charles Joseph Fickey

[57] ABSTRACT

New enclosure material for chemiluminescent light devices which has reduced effect on the chemiluminescent reactants and results in improved storage characteristics for the devices.

6 Claims, No Drawings

CONTAINERS FOR CHEMICAL LIGHT SOLUTIONS

This invention relates to container and devices for chemical light systems and their components. More particularly, it relates to glass containers and devices which are in contact with oxalate ester chemical lighting components.

In our chemiluminescent lighting devices, the development of light depends on the mixing of two chemical components. In one type of device, known as a "lightstick" an outer, flexible, light-transmitting tube, closed at both ends, contains one component and an inner, rigid, breakable tube contains the other component. The light stick is activated to produce light by flexing the outer tube sufficiently to cause breakage of the inner tube and mixing of the contents. Light stick devices are described in U.S. Pat. Nos. 3,576,987 and 3,584,211.

One of the above components contains a chemiluminescent compound and the other component contains a hydroperoxide compound. At least one of the components contains diluent. More detail as to the components an be found in U.S. Pat. No. 3,597,362.

To be of practical value, the light sticks must be storage-stable, i.e., the chemical component of the light sticks should not materially decompose or degenerate in a reasonable length of time, while the light sticks are in storage. A large percentage of the potential light originally available should be produced after an appreciable storage period. The storage temperature may be higher than normal room temperature.

Glass is a desirable material for the inner tube of the light stick. It meets the physical requirements for a rigid, breakable material and it is economical. Unfortunately, it has been found that the common commercial glasses promote the decomposition of the chemical components of the light stick. This is particularly true for the component containing the hydroperoxide compound. The preferred chemiluminescent compound is one of the oxalate types described in U.S. Pat. No. 3,597,362. It is immaterial whether the inner or the outer tube contains the chemiluminescent compound, because the walls of the inner tube are in contact with the contents of both tubes.

The surprising discovery has now been made that when the inner, breakable tube of the light stick is made of glass of a particular composition, the stability of the chemical light components is greatly increased. This discovery holds especially for the oxalate type of chemiluminescent system which, as stated above, is the preferred type and the one of commercial interest. Equal stabilizing effect has not been obtained with other glasses, even when they have been pretreated by soaking in chemical agents, such as caustics, acids, etc., or by coating with silicones, etc.

The glass of use in this invention is manufactured by the Kimble Product Division of Owens-Illinois. The glass is designated as Type N51-A. It is an aluminoborosilicate glass having the following approximate composition:

| | |
|---|---|
| Silica | 70% |
| Boric Oxide | 10% |
| Alumina | 10% |
| Barium Oxide | 2% |
| Calcium Oxide | 1% |
| Sodium Oxide | 6% |
| Potassium Oxide | 1% |

The U.S. Pharmacopeia classifies glass containers into four classes:

Type I, Type II, Type III and N.P., the latter meaning "Non-Parenterial." The classification is based on the amount of alkali that can be extracted by standard U.S. Pharmacopeia test procedures.

For Types I, II and N.P. Glasses a "Powdered Glass Test" is employed. In this test, 10g. of pulverized glass are heated in contact with 50ml. of purified water in a steam autoclave at a temperature of 121°C. for 30 minutes. The use of pulverized glass greatly multiplies the area of contact between the glass and the water and thus increases the sensitivity of the test. The amount of alkali extracted from the glass grains is determined by titration against 0.02 N sulfuric acid with methyl red as indicator.

Using the above test, a Type I glass is defined as one which yields a test result no greater than 1.00 ml. of 0.02 N acid. A Type III glass is one which gives a test result not greater than 8.5 ml., while the limit for N.P. glass is 15.0 ml.

Type II glass refers to containers made of ordinary soda-lime glass and then subjected to a dealkalizing surface treatment which removes a good portion of the alkali from the interior surface of the container. The dealkalizing processes are based on the principle of exposing the glass surface to the action of acid solutions or acid gases at elevated temperatures. Since only the surface has been dealkalized, the pulverized glass test would not apply. In the test procedure, the container is filled with purified water and heated for 1 hour in a steam autoclave at 121°C. The amount of alkali extracted from the glass surface is determined by titration as in the case of Type I pulverized glass test. The test data are somewhat variable, depending on the effectiveness of the particular surface treating process employed. A well-controlled dealkalizing process produces Type II bottles whose alkalinity is approximately equivalent to that of Type I bottles.

As stated above, the use of N51-A glass for the inner breakable tube of the light stick is particularly effective in stabilizing the preferred chemiluminescent compounds which are bis-esters of oxalic acid. A full description of the esters and other components of the chemiluminescent light systems, including hydroperoxide compounds, diluents, fluorescent compounds and various other additives, is found in the previously mentioned U.S. Pat. Nos. 3,576,987 and 3,597,362.

The composition of an acceptable glass can be varied about 10 percent up and down from the composition given above. A preferred range is about 5 percent up and down. The broad and preferred ranges are therefore as shown in Table I.

TABLE I

| | Broad Range | Preferred Range |
|---|---|---|
| Silica | 65–75% | 67–73% |
| Boric oxide | 9–11% | 9.5–10.5% |
| Alumina | 9–11% | 9.5–10.5% |
| Barium Oxide | 1.8–2.2% | 1.9–2.1% |
| Calcium Oxide | 0.9–1.1% | 0.95–1.05% |
| Sodium Oxide | 5.4–6.6% | 6.7–6.3% |
| Potassium Oxide | 0.9–1.1% | 0.95–1.05% |

EXAMPLE I

A solution of 0.111 $M$ bis (2,4,5-trichloro-6-carbobut-oxyphenyl)oxalate[1] and 0.003 $M$ 9,10-bis(phenylethynyl)anthracene[2] in dibutyl phthalate was prepared as one component of a 2-component chemiluminescent system. The second component comprised a solution of 1.5 M hydrogen peroxide and 0.001 M sodium salicylate in a mixture of four parts by volume of dimethyl phthalate and one part by volume of tert-butyl alcohol.

1. The bis(2,4,5-trichloro-6-carbobutoxyphenyl)oxalate can be prepared by the procedure of Case 22,791, Example XXIII.

2. The 9,10-bis(phenylethynyl)anthracene can be prepared by the procedure of Case 22,338, Examples XXXVII and XXXVIII.

The system was activated by combining three parts by volume of the first (oxalate) component with one part by volume of the second (peroxide) component. The light intensity was measured after 30 minutes and again after 60 minutes by the procedure described in U.S. Pat. application Ser. No. 124,142, filed Mar. 15, 1971, using a Hirt-Roberts, spectroradiometer-fluorimeter.

Portions of the second (peroxide) component (1 part by volume) were also sealed into ampules made of various glasses. Each sealed ampule was placed in contact with three parts by volume of the first (oxalate) component which was contained in a material known to be inert to the oxalate solution. After 30 days' storage at 50°C., the chemiluminescent systems were activated by mixing the two components of each stored system, and the light intensities were measured after 30 minutes and after 60 minutes as described above.

The results of the light measurement are shown in Table II.

TABLE II

| Glass | Intensity (ft. lbts. cm.$^{-1}$) | |
|---|---|---|
| | After 30 min. | After 60 min. |
| None° | 21.0 | 13.0 |
| A∞ | 20.0 | 8.2 |
| B∞ | 7.2 | 4.0 |
| C∞ | 4.3 | 1.7 |
| D∞ | 11.0 | 5.2 |

°Components mixed with no storage period
∞Glass A — N51-A glass (Type I)
Glass B — borosilicate glass (Corning 7740); about 81 percent silica, 13 percent boric oxide, 2 percent alumina and 4 percent sodium oxide (Type unknown)
Glass C — Type III soft glass (soda-lime glass)
Glass D — Type III, soft glass (soda-lime glass) which had been soaked overnight in 35 percent nitric acid, rinsed in water and dried
Note: Two other commercial glasses of unknown composition were also tested. The light intensities after 30 and 60 minutes were 7.7 and 3.6 for Corning 7800 and 7.7 and 4.8 for M-1. Corning asserted that of their commercial glasses, Type 7800 glass had the lowest extractable alkali.

Example 1 demonstrates the effectiveness of a glass of this invention versus other glasses as a material for containers and devices for chemical light systems which include oxalate ester chemical lighting components.

We claim:

1. In a multi-compartment, chemiluminescent light device containing chemiluminescent components, the improvement comprising constructing the walls of at least one of the compartments with a glass having a composition of between 65 and 75 percent silica, between 9 and 11 percent boric oxide, between 9 and 11 percent alumina, between 1.8 and 2.2 percent barium oxide, between 0.9 and 1.1 percent calcium oxide, between 5.4 and 6.6 percent sodium oxide and between 0.9 and 1.1 percent potassium oxide.

2. The light device of claim 1 where the glass has a composition of between 67 and 73 percent silica, between 9.5 and 10.5 percent alumina, between 1.9 and 2.1 percent barium oxide, between 0.95 percent and 1.05 percent calcium oxide, between 5.7 and 6.3 percent sodium oxide, and between 0.95 and 1.05 percent potassium oxide.

3. A chemiluminescent light device as in claim 1 comprising an outer container and at least one container enclosed by said outer container, each of said containers having a chemiluminescent reactant which react upon admixture, said inner container being composed said glass.

4. A device as in claim 3, wherein said containers are concentric, tubular containers.

5. The device of claim 4 wherein said outer container is light transmitting.

6. The device of claim 4 wherein said outer container has a dispensing closure.

* * * * *